(12) United States Patent
Han et al.

(10) Patent No.: US 8,819,094 B2
(45) Date of Patent: Aug. 26, 2014

(54) MULTIPLICATIVE DIVISION CIRCUIT WITH REDUCED AREA

(75) Inventors: Kyung-Nam Han, Portland, OR (US); Alexandre Tenca, Beaverton, OR (US); David Tran, Beaverton, OR (US); Rick Kelly, Beaverton, OR (US)

(73) Assignee: Synopsys, Inc., Mountain View, CA (US)

( * ) Notice: Subject to any disclaimer, the term of this patent is extended or adjusted under 35 U.S.C. 154(b) by 1080 days.

(21) Appl. No.: 12/488,956

(22) Filed: Jun. 22, 2009

(65) Prior Publication Data

US 2010/0318592 A1    Dec. 16, 2010

Related U.S. Application Data

(60) Provisional application No. 61/185,929, filed on Jun. 10, 2009.

(51) Int. Cl.
*G06F 7/38* (2006.01)

(52) U.S. Cl.
USPC ............ 708/235; 708/7; 708/620; 708/650; 708/656; 708/844

(58) Field of Classification Search
USPC ........ 708/7, 501–508, 620, 650, 656, 844, 87
See application file for complete search history.

(56) References Cited

U.S. PATENT DOCUMENTS

| | | | |
|---|---|---|---|
| 3,508,038 A * | 4/1970 | Powers et al. | 708/654 |
| 5,065,352 A | 11/1991 | Nakano | |
| 5,377,134 A | 12/1994 | Faget | |
| 5,862,059 A * | 1/1999 | Matula et al. | 708/270 |
| 6,782,405 B1 * | 8/2004 | Matula et al. | 708/504 |
| 7,191,204 B1 * | 3/2007 | Ogata | 708/654 |
| 2006/0064454 A1 | 3/2006 | Wang et al. | |

(Continued)

FOREIGN PATENT DOCUMENTS

| | | |
|---|---|---|
| EP | 0411491 A2 | 2/1991 |
| EP | 0530936 A1 | 3/1993 |
| JP | 63-254525 A | 10/1988 |
| JP | 2001256039 A | 9/2001 |

OTHER PUBLICATIONS

Efficient Initial Approximation and Fast Converging Methods for Division and Square Root by Masayuki Itof, Naofumi Takagit and Shum Yajimat.*
Division Algorithms and Implementations by Stuart F. Oberman.*

(Continued)

*Primary Examiner* — Chat Do
*Assistant Examiner* — Jae Jeon
(74) *Attorney, Agent, or Firm* — Kenta Suzue; Haynes Beffel & Wolfeld LLP

(57) ABSTRACT

The technology is a division circuit with decreased circuit area. An embodiment includes an integrated circuit implementing multiplicative division of a dividend input and a divisor input. The integrated circuit includes a lookup table circuit and multiplier circuits. The lookup table circuit providing an approximation of a reciprocal of a divisor input. The multiplier circuits receive the approximation and refine a quotient output of the dividend input and a divisor input. At least one of the multiplier circuits is a squaring circuit implementing multiplication with a reduced number of intermediate partial products. The reduced number of intermediate partial products prevent the squaring circuit from multiplication of any two unequal numbers and limiting the squaring circuit to multiplication of a same number by the same number.

15 Claims, 9 Drawing Sheets

(56) References Cited

U.S. PATENT DOCUMENTS

2006/0265443 A1* 11/2006 Cornea-Hasegan .......... 708/204
2008/0288571 A1* 11/2008 Kamoshida .................. 708/500
2009/0216824 A1* 8/2009 Weinberg et al. ............ 708/504

OTHER PUBLICATIONS

Optimizing the Multiplier Desing for Goldschmidt's Division and Reciprocal by Units D. Piso.*
Gao ("Efficient Realization of Large Integer Multipliers and Squarers"), 2006.*
"Computer Arithmetic: Algorithms and Hardware Designs" by Behrooz Parhami, Oxford University Press, New York, 200.
International Search Report dated Jan. 28, 2011 for corresponding PCT Application No. PCT/US2010/038124.
Son Dao Trong et al. "P6 Binary Floating-Point Unit" 18th IEEE Symposium on Computer Arithmetic 2007, consisting of 10 pages.
Stuart F. Oberman et al. "Fast IEEE Rounding for Division by Functional Iteration" Computer Systems Laboratory, Jul. 1996, consisting of 22 pages.
Ronen Goldberg et al. "An FPGA Implementation of Pipelined Multiplicative Division With IEEE Rounding," 2007 International Symposium on Field-Programmable Custom Computing Machines, pp. 185-194.
Guy Even et al. "A Parametric Error Analysis of Goldschmidt's Division Algorithm," Proceedings of the 16th IEEE Symposium on Computer Arithmetic 2003, consisting of 7 pages.
Michael J. Schulte et al. "Floating-Point Division Algorithms for an x86 Microprocessor With a Rectangular Multiplier," IEEE 2007, pp. 304-310.
Milos D. Ercegovac et al. "Improving Goldschmidt Division, Square Root, and Square Root Reciprocal," IEEE Transactions on Computers, vol. 49, No. 7, Jul. 2000, pp. 759-763.
Jose-Alejandro Pineiro et al. "High-Speed Double-Precision Computation of Reciprocal, Division, Square Root, and Inverse Square Root," IEEE Transactions on Computers, vol. 51, No. 12, Dec. 2002, pp. 1377-1388.
Robert E. Goldschmidt, "Applications of Division by Convergence," Massachusetts Institute of Technology, Jun. 1964, pp. 1-44.
Extended European search report mailed Dec. 11, 2012 in EP 10 78 6836 (SYNP 1197-6EP) 9pp.
Chen D. et al., "Design and implementation of reciprocal unit," Midwest Symp. on Circuits and Systems, New Jersey, Aug. 2005, pp. 1318-1321.
Lee B.R. et al., "Improved small multiplier based multiplicatio, squaring and division," Proc. 11th Annual IEEE Symp. on Field-Programmable Custom Computing Machines, Apr. 2003, New Jersey, pp. 91-97.
Das Sarma, D. et al., "Faithful bipartite Rom reciprocal tables," Proc. of 12th Symp. on Computer Arithmetic, Bath, UK, Jul. 1995, pp. 17-28.
Tisserand A. et al., "Multipartite Table Methods," IEEE Trans. on Computers, vol. 54, No. 3, Mar. 2005, pp. 319-330.
English translation of JP Office Action mailed Jan. 31, 2013, 2pp.
English translation of KR Office Action mailed May 15, 2013 for related application KR 2012-7000695, 4pp.

* cited by examiner

600

MULTIPLICATIVE DIVISION CIRCUIT WITH REDUCED AREA

REFERENCE TO RELATED APPLICATIONS

The application claims the benefit of U.S. Provisional Patent Application No. 61/185,929 filed 10 Jun. 2009. The application(s) are incorporated by reference.

BACKGROUND

1. Field

The technology relates to circuitry performing multiplicative division, and the cells implementing the circuitry in EDA software.

2. Description of Related Art

Division circuits have been implemented in many ways. Among them, multiplicative division circuits based on the Newton-Raphson method are popular due to quadratic convergence. As an alternative division circuit, the Goldschmidt method takes advantage of parallelism from the Newton-Raphson method. Quadratic convergence makes these division circuits favorable to implement large-operand divisions with high performance. However, the conventional Newton-Raphson and Goldschmidt methods consist of a recursive series of multiplications with full-precision operands, consequently suffering from large area consumption.

SUMMARY

This technology reduces the area of quadratic convergence combinational dividers without compromising performance.

One aspect of the technology is a division circuit with decreased circuit area. An embodiment includes an integrated circuit implementing multiplicative division. The integrated circuit includes a lookup table circuit and multiplier circuits. The lookup table circuit provides an approximation of a reciprocal of a divisor input. The multiplier circuits receive and refine the approximation of the quotient output. At least one of the multiplier circuits is a squaring circuit implementing multiplication with a reduced number of intermediate partial products. The reduced number of intermediate partial products prevent the squaring circuit from multiplication of any two unequal numbers and limiting the squaring circuit to multiplication of a same number by the same number.

In some embodiments, the multiplicative division has quadratic convergence.

In some embodiments, the multiplier circuits include a first series of multiplier circuits with increasingly refined quotient outputs, and a second series of multiplier circuits with decreasing error adjustment outputs. In some embodiments, the first series of multiplier circuits operate in parallel with the second series of multiplier circuits. In some embodiments, the second series of multiplier circuits includes the squaring circuit. In some embodiments, the multiplier circuits include multiple squaring circuits In some embodiments, the lookup table circuit is a bipartite lookup table circuit. In some embodiments, the lookup table circuit is a multipartite lookup table circuit, such that the multipartite lookup table circuit includes multiple offset value tables. In some embodiments, the lookup table circuit is a direct lookup table circuit.

In some embodiments, the squaring circuit operates on an input operand having an input width smaller than that of the dividend input and smaller than that of the divisor input.

Another aspect of the technology is a computer system implementing the technology.

Another aspect of the technology is a computer readable medium implementing the technology.

DETAILED DESCRIPTION

Figure 1:
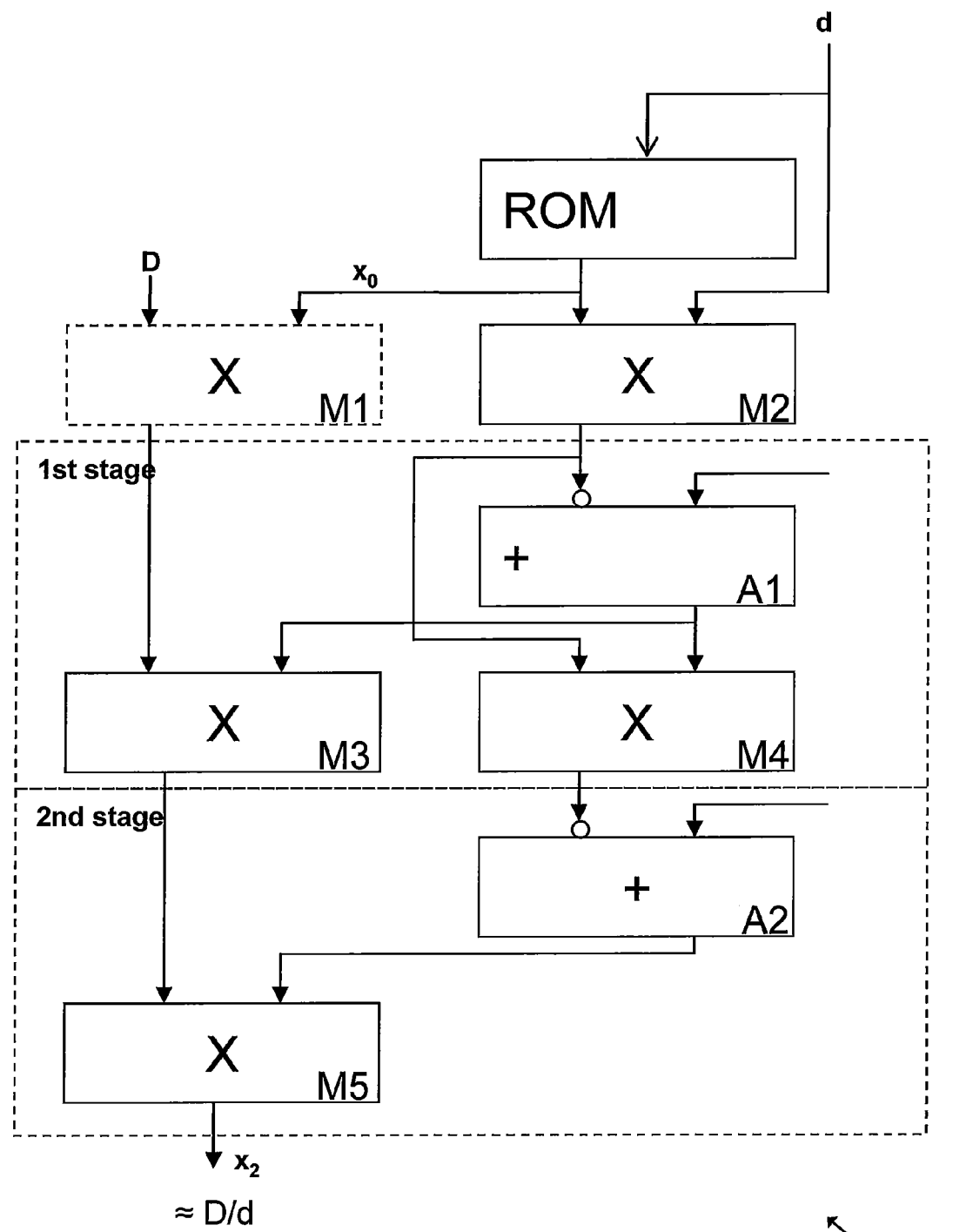
FIG. 1 shows a block diagram of a Goldschmidt multiplicative divider.

FIG. 1 shows a block diagram of a Goldschmidt multiplicative divider.

The classical Newton-Raphson method for the reciprocal of 1/B implements the equation of:

$$x[n+1]=x[n]*(2-B*x[n])$$

where x[0] is the seed from a look-up table (LUT), and x[infinity]=1/B. Division of A/B is obtained by multiplying A and x[n].

The Newton-Raphson method is a series only multiplication and so suffers a speed penalty.

The conventional Goldschmidt method implements equations of the type:

$$q[n+1]=q[n]*(2-y[n])$$

$$y[n+1]=y[n]*(2-y[n])$$

$$y[n]<2$$

where q[0]=A*seed from LUT, y[0]=B*seed from LUT, and q[infinity]=A/B.

y[n] of the conventional algorithm keeps full precision after iterations.

The conventional Goldschmidt method allows parallel multiplication with increased speed.

The Goldschmidt circuit does not have any square logic. For example, y[1] is the multiplication of y[0]*(2−y[0]), which is not a quaring operation.

Both the Newton-Raphson method and the Goldschmidt method require full-precision multiplications at each step. For example, for the 24-bit division circuit with Goldschmidt method requires two 9 b×24 b multiplier circuits and three 27 b×27 b multiplier circuits with 8 b seed from LUT. Because of the heavy use of hardware resources, alternatives reduce area by re-using a single multiplier in a sequential system, or other techniques using a rectangular multiplier. However, such techniques cannot be applied to combinational dividers.

To reduce area and improve performance of the division circuit, the recursive equation of the conventional Goldschmidt method is modified and implemented by small-precision multiplier circuits, instead of full-precision multiplier circuits.

The Goldschmidt method is revised and modified to implement equations of the type:

$$q[n+1]=q[n]*(1+r[n])=q[n]+q[n]*r[n]$$

$$r[n+1]=r[n]^2$$

$$r[n]<2^{-k2^{n-1}}$$

where q[0]=A*seed from LUT, r[0]=1−B*seed from LUT, and q[infinity]=A/B.

The precision of r[n] is quadratically reduced and it converges to zero.

The quotient, q[n], is updated by multiplying small-precision r[n] and adding it to q[n], instead of multiplying full-precision y[n] as in the Goldschmidt method.

The required precision of r[n] is reduced quadratically by the squaring operation, while q[n] keeps full precision, as it iterates.

Many embodiment of this implementation require only multipliers with input widths smaller than that of dividend or divisor.

These equations replace y[n] with 1−r[n] from the conventional Goldschmidt method. Because r[n] has quadratic convergence to 0, the required precision of r[n] becomes smaller as it iterates. One way to implement a 24-bit divider circuit with this equation uses two 9 b×24 b multipliers, one 20 b×20 b multiplier, and two 13 b×13 b multipliers.

Figure 2:
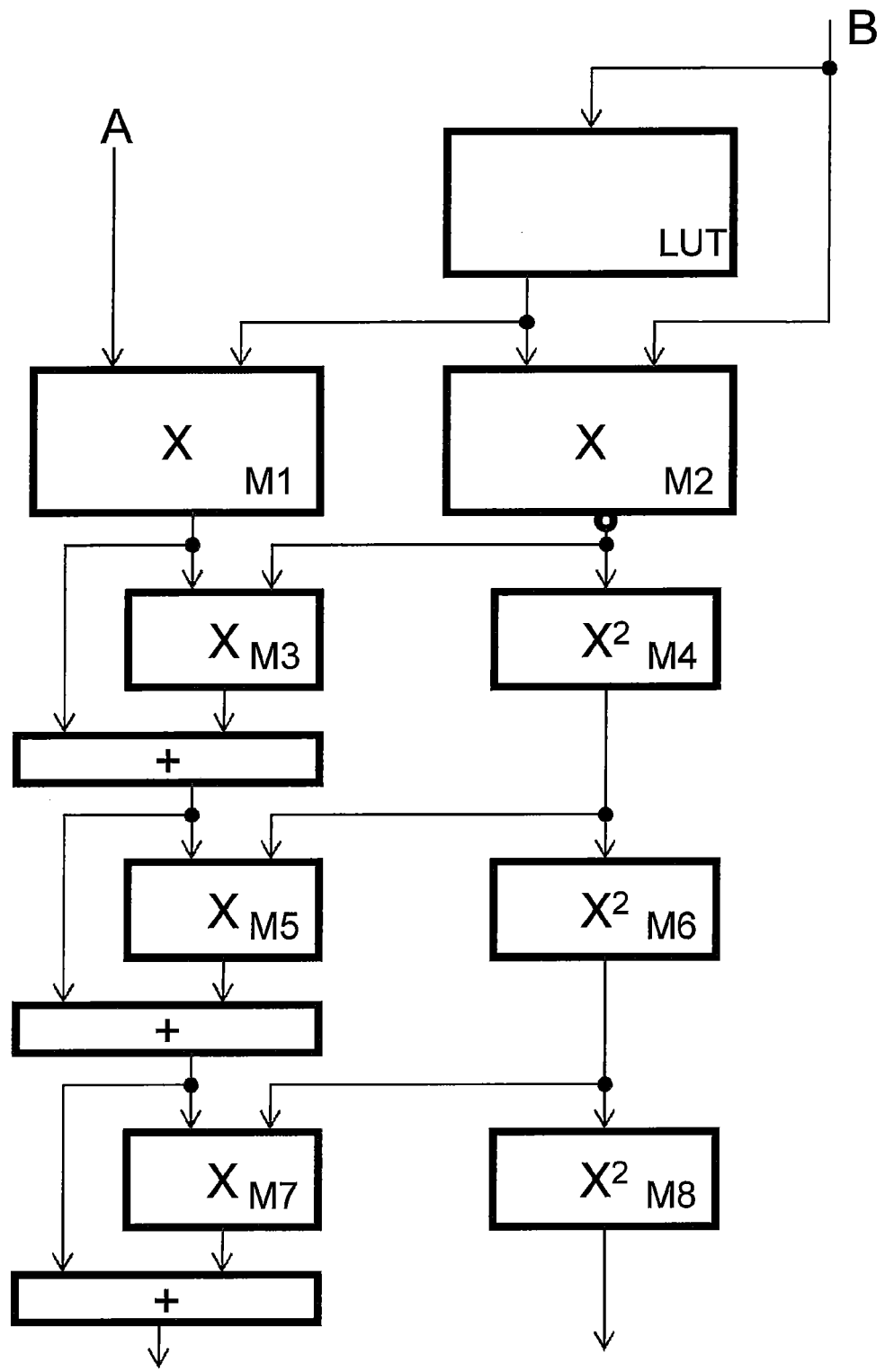
FIG. 2 shows a block diagram of a multiplicative divider including a squaring circuit as described herein, with a generalized number of stages.

FIG. 2 shows a block diagram of a multiplicative divider including a squaring circuit as described herein, with a generalized number of stages.

The number of stages varies with the required precision and with the LUT, as described herein. Also, the position(s) of the squaring circuit varies, as described herein.

Figure 3:
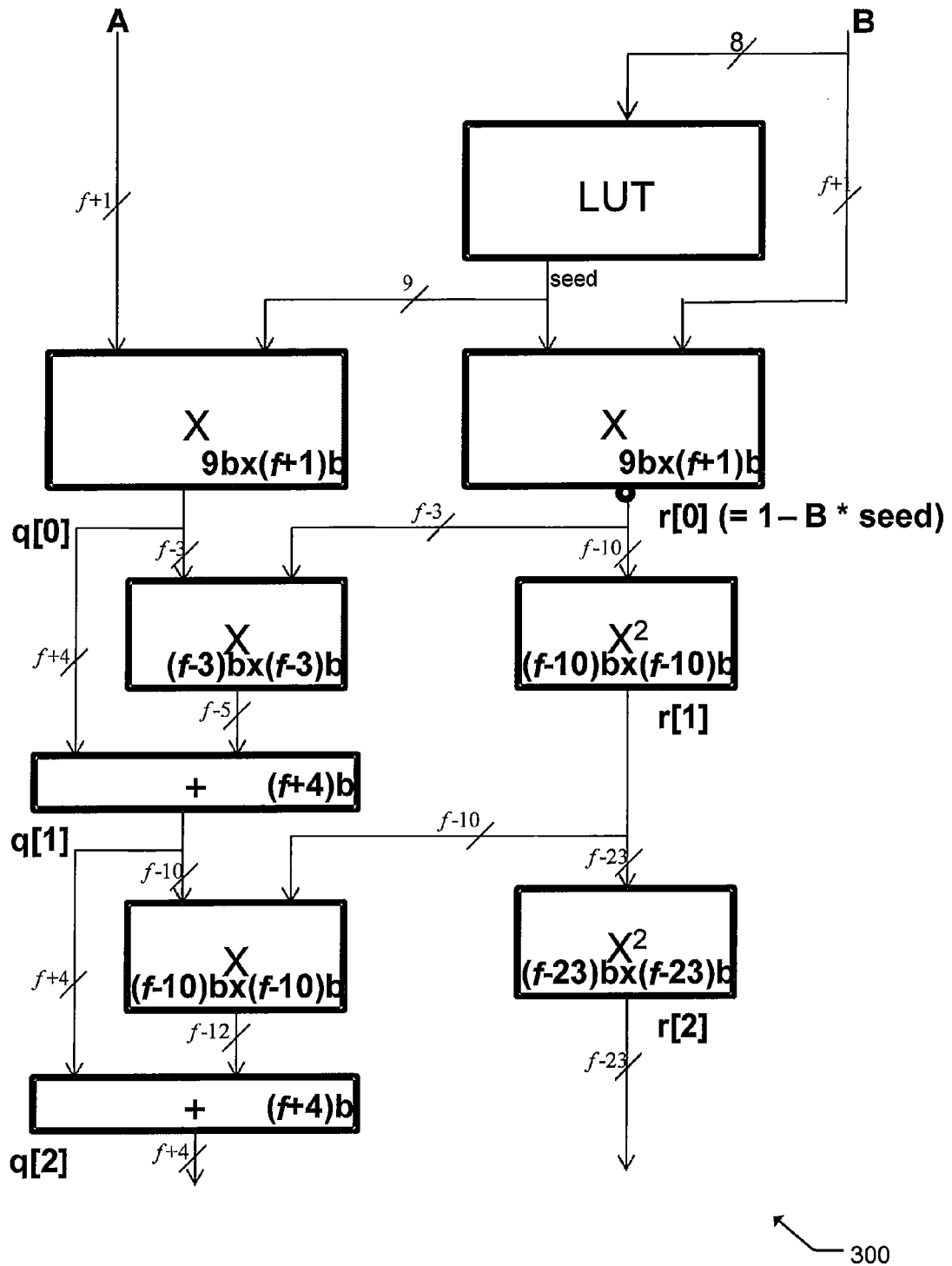
FIG. 3 shows a block diagram of a specific multiplicative divider including a squaring circuit as described herein.

FIG. 3 shows a block diagram of a specific multiplicative divider including a squaring circuit as described herein.

In particular, shown is a block diagram of 32b single precision floating-point divider with 8b LUT.

The right column of multipliers corresponds to the correction terms r[n] quadratically converging to zero with each stage. The left column of multipliers corresponds to the quotient terms q[n] generating increasingly precise quotients with each stage. The top row of multipliers correspond to the n=0 terms generated from the divisor and dividend inputs and the LUT. Each subsequent row corresponds to a following stage.

$$Q=A/B, f=23$$

A: Dividend
B: Divisor
Q: quotient (24 b)
Dimensions
(24 b reciprocal)
M1: 9 b×24 b
M2: 9 b×24 b
M3: 20 b×20 b
M4: 13 b×13 b
M5: 13 b×13 b As shown by the labels X or $X^2$, M4 is a squaring circuit, and the remaining multipliers M1, M2, M3, and M5 are general multipliers rather than squaring circuits. The adder circuits are commonly implemented as part of the preceding multiplier, such that adder circuit A1 is implemented with multiplier M3, and adder circuit A2 is implemented with multiplier M5.

The division circuit implements the modified algorithm with the reduced hardware. Parameter f denotes the significand width, and f is 23 for the single-precision floating-point division.

Incorporated by reference in its entirety is "Computer Arithmetic: Algorithms and Hardware Designs" by Behrooz Parhami, Oxford University Press, New York, 2000. A squaring circuit is a special case of a standard or modular multiplier. Although a standard or modular multiplier can be used for computing a square by having both its inputs receive the same number, a squaring circuit specially customized in hardware has lower area and delay than a standard or modular multiplier that can multiply two arbitrary nonequal numbers. Generally, multiplication involves a process of generating a matrix of partial products of each digit of a first operand with each digit of a second operand. The squaring circuit substantially reduces the partial products matrix. For example, the partial product term xx reduces to x. In another example, the partial product terms xy and yx in a same matrix column (columns indicating the position of each significant figure) reduces to xy in the next higher column. In another example, xy+x=2xy +x$\overline{y}$. This reduces the width of a carry-propagate adder. These customizations prevent the squaring circuit from performing multiplication of two arbitrary nonequal numbers (because, e.g. the partial products that were eliminated in the customized squaring circuit are required for multiplication of two arbitrary nonequal numbers).

The performance of squaring logic is better than that of the multiplier. For example, an experiment using Design Compiler shows that the best performance of the 32 b squaring logic is 1.71 ns delay and 18580 area, while the best performance of the 32 b multiplier is 1.91 ns delay and 29494 area, with 90 nm technology.

Particulars of the squaring logic depend on the size of LUT, the precision of input and the precision of output. Placement of the square logic is based on the recursive equation above. For example, if the division implements 24 b mantissa precision with a 16 b LUT, then q[1] is enough for 24 b precision, and M4 and M5 are not necessary.

According to the recursive equation above, M4 is the implementation of $r[i+1]=r[i]^2$, where $r[i]<2^{-2^{in}}$. That is, M4 performs the square operation of the number that has leading zeros. For good performance, the minimum size of the squaring logic is determined by the output precision and the size of LUT. In one embodiment 13 b×13 b is the minimum size of M4 that shows the best performance with the smallest area while keeping the correct division result. However, other embodiments can implement M4 with 14 b×13 b or 20 b×20 b or any larger squaring logic, because the square result with the number that has leading zeros remains the same.

The existence of the squaring logic is not restricted to M4. The advantages of squaring logic can be applied to M6, M8 and more. The existence of M4, M6, M8 and so on is determined by the input and output precision as well as the LUT size. Common LUT sizes are 8 b LUT and 16 b LUT. In one example, if LUT has 16 b, 24 b mantissa division does not require any squaring logic, but 53 b mantissa division requires M4, and 100 b division requires M4 and M6. In some embodiments, for better performance, 15 b LUT or 14 b LUT can be used after optimization.

Figure 4:
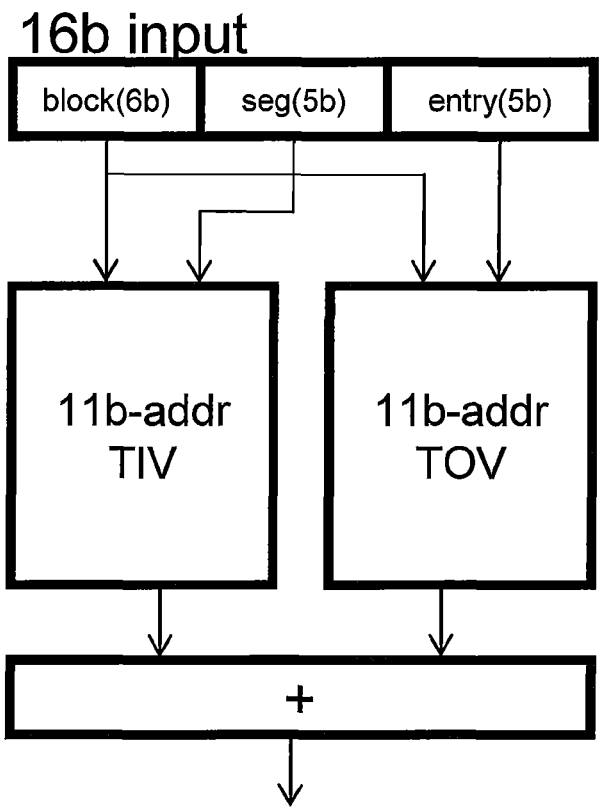
FIG. 4 shows a bipartite lookup table in some embodiments of the multiplicative divider.

FIG. 4 shows a bipartite lookup table in some embodiments of the multiplicative divider.

Figure 5:
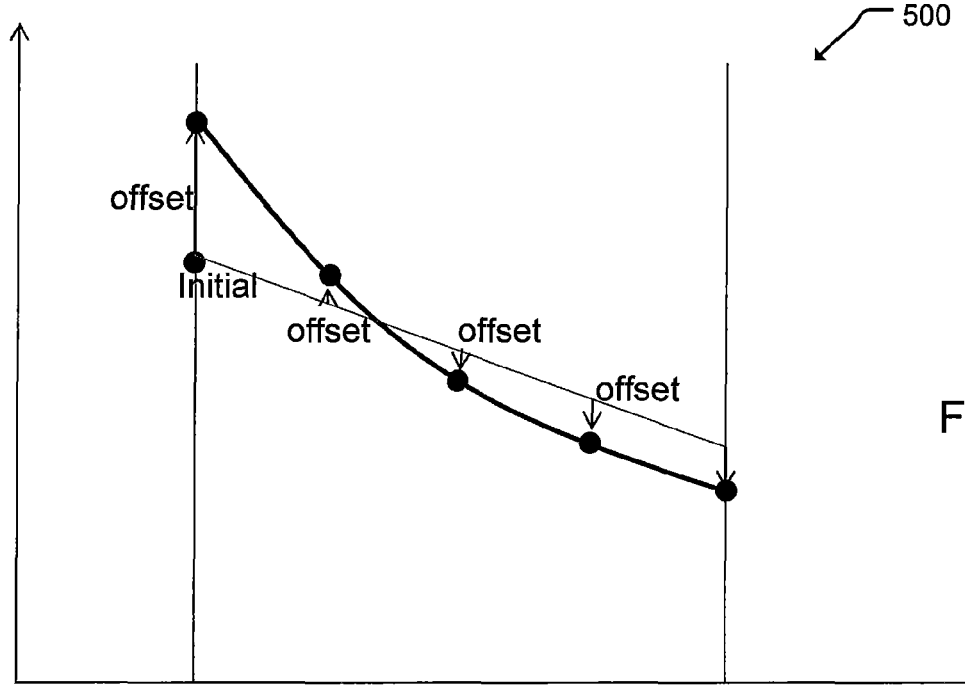
FIG. 5 shows a graph showing an application of the two tables of the bipartite lookup table in FIG. 4.

FIG. 5 shows a graph showing an application of the two tables of the bipartite lookup table in FIG. 4.

Figure 6:
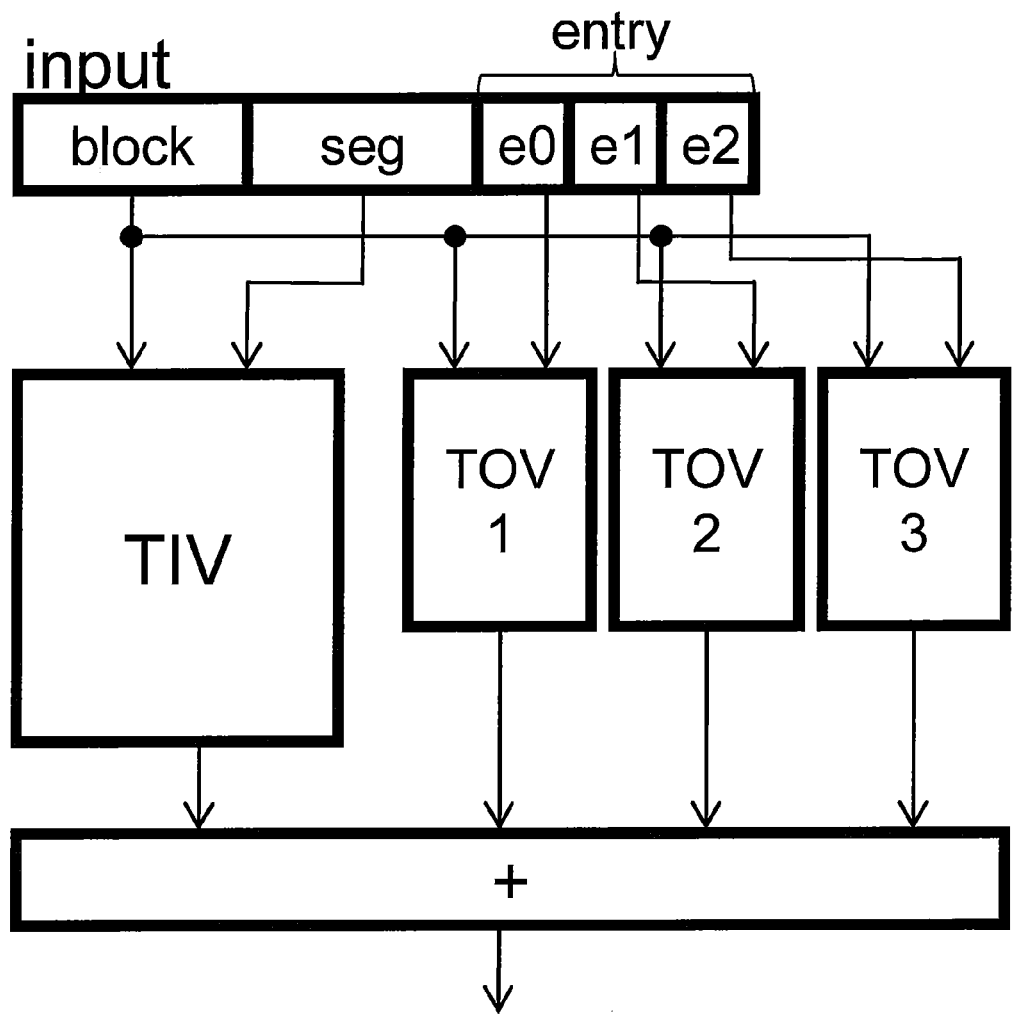
FIG. 6 shows a multipartite lookup table in some embodiments of the multiplicative divider.

FIG. 6 shows a multipartite lookup table in some embodiments of the multiplicative divider.

The LUT can be a direct LUT, bi-partite LUT, or multi-partite LUT. Incorporated by reference are D. Das Sarma and D. Matula, "Faithful Bipartite ROM Reciprocal Tables," Proc. 12th IEEE Symp. Computer Arithmetic, S. Knowles and W. McAllister, eds., pp. 17-28, 1995; and F. de Dinechin and A. Tisserand, "Multipartite Table Methods," IEEE Trans. Comput., Vol. 54, No. 3, pp. 319-330, March 2005.

A direct LUT is straightforward. However, a larger direct LUT, such as a 16 b direct LUT implementation, is impractical due to the large area consumption. Accordingly, the other techniques make use of the fact that the LUT does not have to store the exact value, but approximate values within 1 ulp error range.

An example bi-partite LUT has tables for initial value and offset value. For example, the area of a 16 b bi-partite LUT becomes practical and similar to the area of an 11 b~12 b direct LUT.

An example multi-partite LUT has a table for initial value and multiple tables for offset value. The offset comes from linear approximation. TOV can be divided into smaller tables.

If the lookup table size has n-bits, than the error range becomes smaller than $2^{-n}$. Various embodiments use a n-bit LUT of various n's.

For example:

The error of the output of the first stage becomes smaller than $2^{-2n}$.

The error of the output of the second stage becomes smaller than $2^{-4n}$.

The error of the output of the third stage becomes smaller than $2^{-8n}$.

If the 8 b LUT is used, a 2nd stage is required for 24 b mantissa division (32 b FP division), and a 3rd stage is required for 53 b mantissa division (64 b FP division), and 4th stage is required for larger than 64 b mantissa.

In addition, if the 16 b LUT is used, 1st stage is required for 24 b mantissa division (32 b FP division), a 2nd stage is required for 53 b mantissa division (64 b FP division), and a 3rd stage is required for larger than 64 b mantissa.

Various embodiments use a various number of stages. Define w be the width of operand. Then, the size of M4 becomes (w−n)-bit×(w−n)-bit. If there is a second stage, the square logic for r[2] becomes (w−2n)-bit×(w−2n)-bit. If there is an mth-stage, the square logic for r[m] becomes (w−mn)-bit×(w−mn)-bit.

A traditional Goldschmidt multiplicative divider, for single-precision floating point, lacks the squaring circuit M4, and instead has an inefficient standard or modular multiplier, as a direct result of implementing a different multiplicative division.

Figure 10:
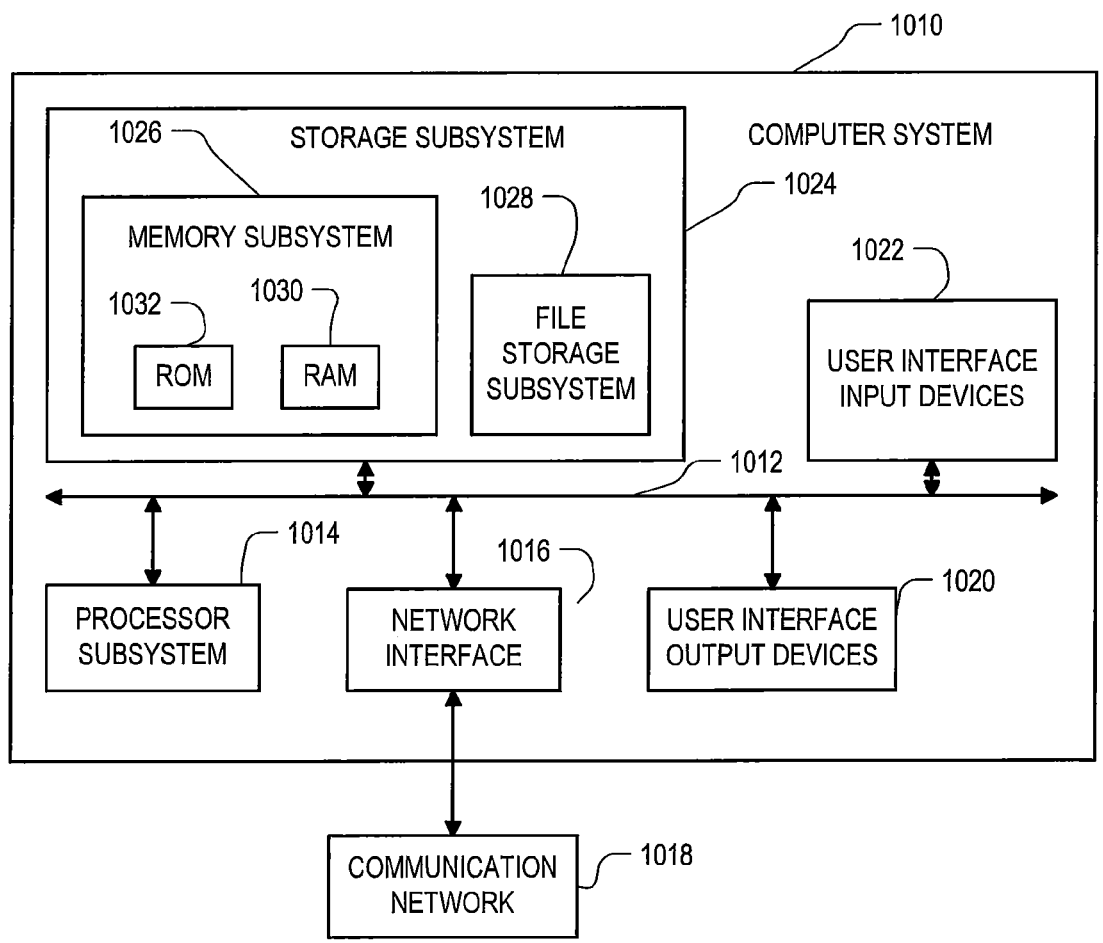
FIG. 10 is a simplified block diagram of a computer system that can be used to implement software incorporating aspects of the technology.

The described technology can be implemented in cells such as a fixed-point and floating point divider and reciprocal circuit, and stored in a computer readable medium, such as shown in 1028 of FIG. 10.

Figure 7:
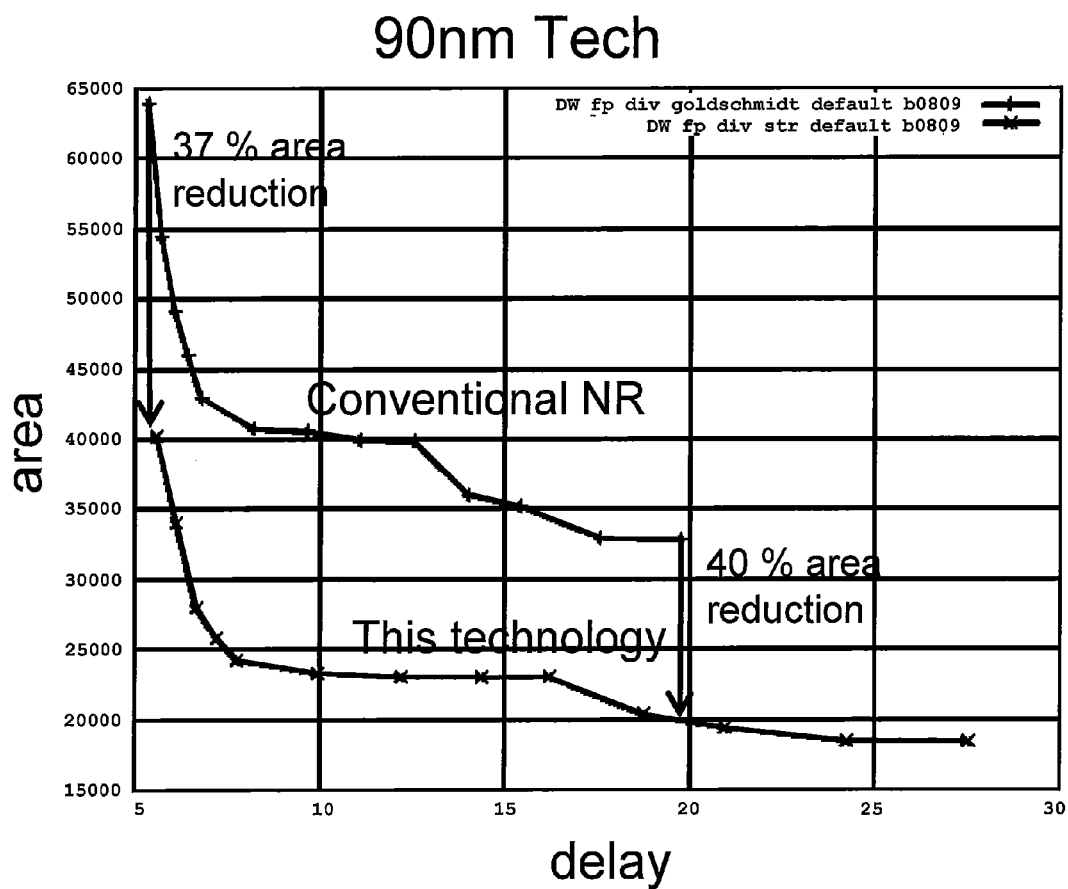
FIG. 7 shows a comparative graph showing the reduced area consumed by an embodiment of the multiplicative division circuit described herein.

FIG. 7 shows a comparative graph showing the reduced area consumed by an embodiment of the multiplicative division circuit described herein.

Shown is the benchmark comparison for the single-precision floating-point divider with f=23. The benchmark comparison uses Design Compiler with 0906 version, compile_ultra and 90 nm technology. The x-axis represents the delay time and the y-axis represents the area of the compiled netlist. The top line is the curve of the traditional Goldschmidt circuit, and the bottom line is the curve of a circuit of this technology. With speed optimization, it shows that the area was reduced by 37% while the delay time becomes similar. With area optimization, this technology shows 30~40% area reduction compared to the Goldschmidt divider circuit.

The technology improves the qor (quality of results) of divider circuits implemented by quadratic convergence methods by reducing the area of the divider circuit with small-precision multiplier circuits while keeping the accuracy of the results. The divider circuit reduces the precision of the multiplication operation used in conventional circuit implementations.

The size of a multiplier is mainly dependent on the output size rather than the size of the dividend and the divisor.

Figure 8:
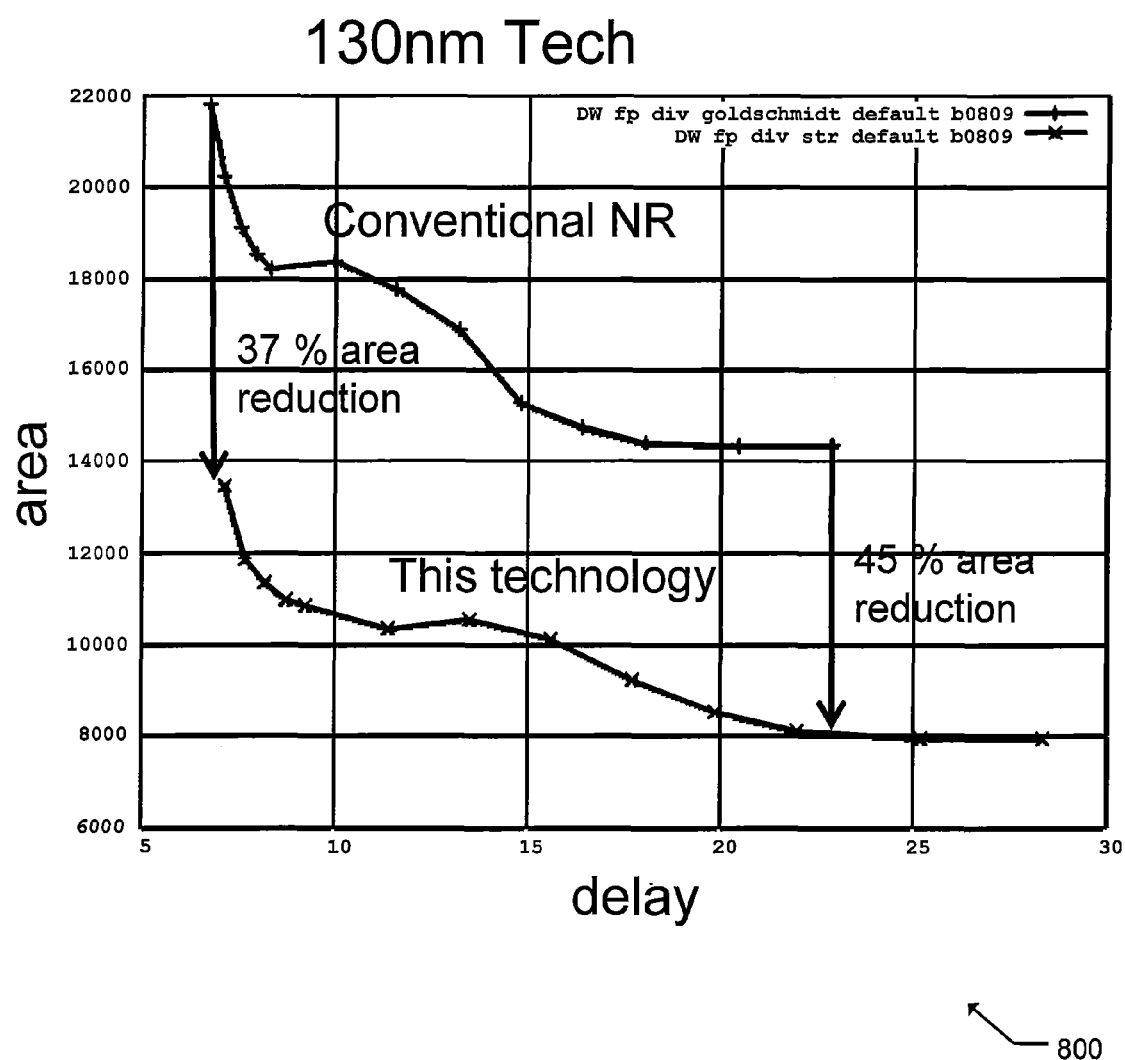
FIG. 8 shows a comparative graph showing the reduced area consumed by an embodiment of the multiplicative division circuit described herein.

FIG. 8 shows a comparative graph showing the reduced area consumed by an embodiment of the multiplicative division circuit described herein.

Figure 9:
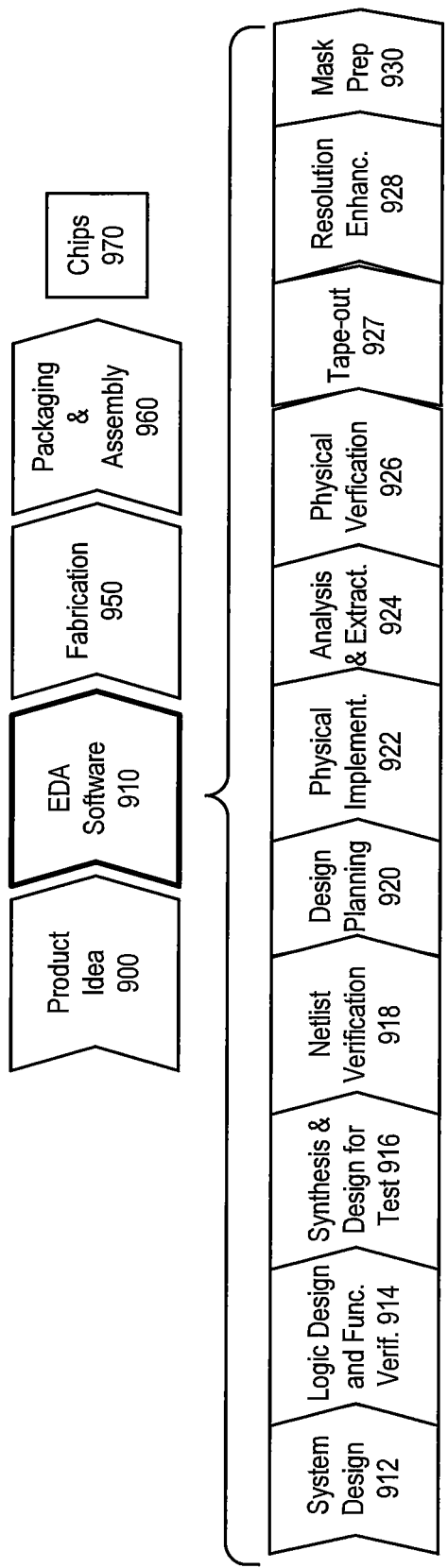
FIG. 9 shows a simplified representation of an illustrative integrated circuit design flow incorporating features of the technology.

FIG. 9 shows a simplified representation of an illustrative integrated circuit design flow incorporating features of the technology. At a high level, the process starts with the product idea (step 900) and is realized in an EDA (Electronic Design Automation) software design process (step 910). When the design is finalized, it can be taped-out (step 940). After tape out, the fabrication process (step 950) and packaging and assembly processes (step 960) occur resulting, ultimately, in finished integrated circuit chips (result 970).

The EDA software design process (step 910) is actually composed of a number of steps 912-930, shown in linear fashion for simplicity. In an actual integrated circuit design process, the particular design might have to go back through steps until certain tests are passed. Similarly, in any actual design process, these steps may occur in different orders and combinations. This description is therefore provided by way of context and general explanation rather than as a specific, or recommended, design flow for a particular integrated circuit.

A brief description of the components steps of the EDA software design process (step 910) will now be provided.

System design (step 912): The designers describe the functionality that they want to implement, they can perform what-if planning to refine functionality, check costs, etc. Hardware-software architecture partitioning can occur at this stage. Example EDA software products from Synopsys, Inc. that can be used at this step include Model Architect, Saber, System Studio, and DesignWare® products.

Logic design and functional verification (step 914): At this stage, the VHDL or Verilog code for modules in the system is written and the design is checked for functional accuracy. More specifically, the design is checked to ensure that produces the correct outputs in response to particular input stimuli. Example EDA software products from Synopsys, Inc. that can be used at this step include VCS, VERA, DesignWare®, Magellan, Formality, ESP and LEDA products.

Synthesis and design for test (step 916): Here, the VHDL/Verilog is translated to a netlist. The netlist can be optimized for the target technology. Additionally, the design and implementation of tests to permit checking of the finished chip occurs. Example EDA software products from Synopsys, Inc. that can be used at this step include Design Compiler®, Physical Compiler, Test Compiler, Power Compiler, FPGA Compiler, Tetramax, and DesignWare® products.

Netlist verification (step 918): At this step, the netlist is checked for compliance with timing constraints and for correspondence with the VHDL/Verilog source code. Example EDA software products from Synopsys, Inc. that can be used at this step include Formality, PrimeTime, and VCS products.

Design planning (step 920): Here, an overall floor plan for the chip is constructed and analyzed for timing and top-level routing. Example EDA software products from Synopsys, Inc. that can be used at this step include Astro and IC Compiler products.

Physical implementation (step 922): The placement (positioning of circuit elements) and routing (connection of the same) occurs at this step. Example EDA software products from Synopsys, Inc. that can be used at this step include the Astro and IC Compiler products.

Analysis and extraction (step 924): At this step, the circuit function is verified at a transistor level, this in turn permits what-if refinement. Example EDA software products from Synopsys, Inc. that can be used at this step include AstroRail, PrimeRail, Primetime, and Star RC/XT products.

Physical verification (step 926): At this step various checking functions are performed to ensure correctness for: manufacturing, electrical issues, lithographic issues, and circuitry. Example EDA software products from Synopsys, Inc. that can be used at this step include the Hercules product.

Tape-out (step 927): This step provides the "tape out" data for production of masks for lithographic use to produce finished chips. Example EDA software products from Synopsys, Inc. that can be used at this step include the CATS(R) family of products.

Resolution enhancement (step 928): This step involves geometric manipulations of the layout to improve manufacturability of the design. Example EDA software products from Synopsys, Inc. that can be used at this step include Proteus, ProteusAF, and PSMGen products.

Mask data preparation (step 930): This step provides the "tape-out" data for production of masks for lithographic use to produce finished chips. Example EDA software products from Synopsys, Inc. that can be used at this step include the CATS(R) family of products.

FIG. 10 is a simplified block diagram of a computer system that can be used to implement software incorporating aspects of the technology.

Computer system 1010 typically includes a processor subsystem 1014 which communicates with a number of peripheral devices via bus subsystem 1012. These peripheral devices may include a storage subsystem 1024, comprising a memory subsystem 1026 and a file storage subsystem 1028, user interface input devices 1022, user interface output devices 1020, and a network interface subsystem 1016. The input and output devices allow user interaction with computer system 1010. Network interface subsystem 1016 provides an interface to outside networks, including an interface to communication network 1018, and is coupled via communication network 1018 to corresponding interface devices in other computer systems. Communication network 1018 may comprise many interconnected computer systems and communication links. These communication links may be wireline links, optical links, wireless links, or any other mechanisms for communication of information. While in one embodiment, communication network 1018 is the Internet, in other embodiments, communication network 1018 may be any suitable computer network.

The physical hardware component of network interfaces are sometimes referred to as network interface cards (NICs), although they need not be in the form of cards: for instance they could be in the form of integrated circuits (ICs) and connectors fitted directly onto a motherboard, or in the form of macrocells fabricated on a single integrated circuit chip with other components of the computer system.

User interface input devices 1022 may include a keyboard, pointing devices such as a mouse, trackball, touchpad, or graphics tablet, a scanner, a touch screen incorporated into the display, audio input devices such as voice recognition systems, microphones, and other types of input devices. In general, use of the term "input device" is intended to include all possible types of devices and ways to input information into computer system 1010 or onto computer network 1018.

User interface output devices 1020 may include a display subsystem, a printer, a fax machine, or non visual displays such as audio output devices. The display subsystem may include a cathode ray tube (CRT), a flat panel device such as a liquid crystal display (LCD), a projection device, or some other mechanism for creating a visible image. The display subsystem may also provide non visual display such as via audio output devices. In general, use of the term "output device" is intended to include all possible types of devices and ways to output information from computer system 1010 to the user or to another machine or computer system.

Storage subsystem 1024 stores the basic programming and data constructs that provide the functionality of certain aspects of the present invention. For example, the various modules implementing the functionality of a circuit simulator and computer-implemented steps in the prior figures may be stored in storage subsystem 1024. These software modules are generally executed by processor subsystem 1014. The data constructs stored in the storage subsystem 1024 also can include any technology files, macrocell libraries, layout files, and other databases mentioned herein. Note that in some embodiments, one or more of these can be stored elsewhere but accessibly to the computer system 1010, for example via the communication network 1018.

Memory subsystem 1026 typically includes a number of memories including a main random access memory (RAM) 1030 for storage of instructions and data during program execution and a read only memory (ROM) 1032 in which fixed instructions are stored. File storage subsystem 1028 provides persistent storage for program and data files, and may include a hard disk drive, a floppy disk drive along with associated removable media, a CD ROM drive, an optical drive, or removable media cartridges. The databases and modules implementing the functionality of certain embodiments of the invention may have been provided on a computer readable medium such as one or more CD-ROMs (or may have been communicated to the computer system 1010 via the communication network 1018), and may be stored by file storage subsystem 1028. The host memory 1026 contains, among other things, computer instructions which, when executed by the processor subsystem 1010, cause the computer system to operate or perform functions as described herein. As used herein, processes and software that are said to run in or on "the host" or "the computer", execute on the processor subsystem 1014 in response to computer instructions and data in the host memory subsystem 1026 including any other local or remote storage for such instructions and data.

Bus subsystem 1012 provides a mechanism for letting the various components and subsystems of computer system 1010 communicate with each other as intended. Although bus subsystem 1012 is shown schematically as a single bus, alternative embodiments of the bus subsystem may use multiple busses.

Computer system 1010 itself can be of varying types including a personal computer, a portable computer, a workstation, a computer terminal, a network computer, a television, a mainframe, or any other data processing system or user device. Due to the ever changing nature of computers and networks, the description of computer system 1010 depicted in FIG. 10 is intended only as a specific example for purposes of illustrating the preferred embodiments of the present invention. Many other configurations of computer system 1010 are possible having more or less components than the computer system depicted in FIG. 10.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

The invention claimed is:

1. A division circuit with decreased circuit area, comprising:
    an integrated circuit implementing multiplicative division of a dividend input and divisor input, comprising:
        a reciprocal circuit providing an approximation of a reciprocal of a divisor input;
        a plurality of multiplier circuits receiving the approximation and refining a quotient output of the dividend input and a divisor input, wherein at least one of the plurality of multiplier circuits is a squaring circuit implementing multiplication preventing the squaring circuit from multiplication of any two unequal numbers and limiting the squaring circuit to multiplication of a same number by the same number,
    wherein the plurality of multiplier circuits includes a first series of multiplier circuits with increasingly refined quotient outputs, and a second series of multiplier circuits with decreasing error adjustment outputs, and the second series of multiplier circuits includes the squaring circuit,
    wherein, after a first one of the increasingly refined quotient outputs, an addition of addends by the integrated circuit generates each of the increasingly refined quotient outputs,
    wherein a first one of the addends is a prior one of the increasingly refined quotient outputs, and a second one of the addends is a product of a first operand and a second operand, the first operand being one of the decreasing error adjustment outputs and the second operand being the prior one of the increasingly refined quotient outputs,
    wherein the second one of the addends has a precision, and the precision of the second one of the addends is smaller in the addition to generate any subsequent one of the increasingly refined quotient outputs, than the precision of the second one of the addends in the addition to generate any earlier one of the increasingly refined quotient outputs,
    wherein each of the plurality of multiplier circuits has a maximum input operand size, the maximum input operand size of any subsequent multiplier circuit in the first series of multiplier circuits is smaller than the maximum input operand size of any prior multiplier circuit in the first series of multiplier circuits, and the maximum input operand size of any subsequent multiplier circuit in the second series of multiplier circuits is smaller than the maximum input operand size of any prior multiplier circuit in the second series of multiplier circuits,
    wherein the squaring circuit operates on an input operand having an input width smaller than at least one of the dividend input and the divisor input,
    wherein the squaring circuit is computationally sufficient to compute a subsequent one of the decreasing error adjustment outputs from a prior one of the decreasing error adjustment outputs.

2. The division circuit of claim 1, wherein the multiplicative division has quadratic convergence.

3. The division circuit of claim 1, wherein the plurality of multiplier circuits includes a first series of multiplier circuits with increasingly refined quotient outputs, and a second series of multiplier circuits with decreasing error adjustment outputs.

4. The division circuit of claim 1,
    wherein the plurality of multiplier circuits includes a first series of multiplier circuits with increasingly refined quotient outputs, and a second series of multiplier circuits with decreasing error adjustment outputs, and first series of multiplier circuits operate in parallel with the second series of multiplier circuits.

5. The division circuit of claim 1, wherein the reciprocal circuit provides the approximation of the reciprocal values with a smaller bit width than the divisor input.

6. The division circuit of claim 1, wherein the reciprocal circuit is a lookup table circuit that provides the approximation of the reciprocal values with a smaller bit width than the divisor input.

7. The division circuit of claim 1, wherein the reciprocal circuit is at least one of a direct lookup table circuit, a bipartite lookup table circuit, and a multipartite lookup table circuit.

8. The division circuit of claim 1, wherein the squaring circuit operates on an input operand having an input width smaller than at least one of the dividend input and the divisor input.

9. The division circuit of claim 1, wherein the plurality of multiplier circuits includes a first series of multiplier circuits with increasingly refined quotient outputs, and a second series of multiplier circuits with decreasing error adjustment outputs, and the second series of multiplier circuits includes the squaring circuit.

10. The division circuit of claim 1,
    wherein the plurality of multiplier circuits includes a plurality of squaring circuits, and
    wherein the plurality of multiplier circuits includes the first series of multiplier circuits with increasingly refined quotient outputs, and the second series of multiplier circuits with decreasing error adjustment outputs, and the second series of multiplier circuits includes the plurality of squaring circuits.

11. The division circuit of claim 1,
    wherein the plurality of multiplier circuits includes a plurality of squaring circuits, and
    wherein the plurality of multiplier circuits includes the first series of multiplier circuits with increasingly refined quotient outputs, and the second series of multiplier circuits with decreasing error adjustment outputs, and the second series of multiplier circuits includes the plurality of squaring circuits,
    wherein the squaring circuits operate on input operands having input widths smaller than that at least one of the dividend input and the divisor input.

12. A computer system for laying out an integrated circuit design, the computer system comprising a processor and a memory,
    the computer system generating a first layout of a first integrated circuit design, the first layout defining a plurality of masks, the masks defining a plurality of features in fabrication process, the features defining an integrated circuit implementing multiplicative division of a dividend input and a divisor input, the integrated circuit comprising:
        a reciprocal circuit providing an approximation of a reciprocal of a divisor input;

a plurality of multiplier circuits receiving the approximation and refining a quotient output of the dividend input and a divisor input, wherein at least one of the plurality of multiplier circuits is a squaring circuit implementing multiplication preventing the squaring circuit from multiplication of any two unequal numbers and limiting the squaring circuit to multiplication of a same number by the same number, wherein the plurality of multiplier circuits includes a first series of multiplier circuits with increasingly refined quotient outputs, and a second series of multiplier circuits with decreasing error adjustment outputs, and the second series of multiplier circuits includes the squaring circuit, wherein, after a first one of the increasingly refined quotient outputs, an addition of addends by the integrated circuit generates each of the increasingly refined quotient outputs, wherein a first one of the addends is a prior one of the increasingly refined quotient outputs, and a second one of the addends is a product of a first operand and a second operand, the first operand being one of the decreasing error adjustment outputs and the second operand being the prior one of the increasingly refined quotient outputs, wherein the second one of the addends has a precision, and the precision of the second one of the addends is smaller in the addition to generate any subsequent one of the increasingly refined quotient outputs, than the precision of the second one of the addends in the addition to generate any earlier one of the increasingly refined quotient outputs, wherein each of the plurality of multiplier circuits has a maximum input operand size, the maximum input operand size of any subsequent multiplier circuit in the first series of multiplier circuits is smaller than the maximum input poperand size of any prior multiplier circuit in the first series of multiplier circuits, and the maximum input operand size of any subsequent multiplier circuit in the second series of multiplier circuits is smaller than the maximum input operand size of any prior multiplier circuit in the second series of multiplier circuits, wherein the squaring circuit operates on an input operand having an input width smaller than at least one of the dividend input and the divisor input, wherein the squaring circuit is computationally sufficient to compute a subsequent one of the decreasing error adjustment outputs from a prior one of the decreasing error adjustment outputs.

13. The computer system of claim 12, wherein the plurality of multiplier circuits includes a plurality of squaring circuits, and wherein the plurality of multiplier circuits includes the first series of multiplier circuits with increasingly refined quotient outputs, and the second series of multiplier circuits with decreasing error adjustment outputs, and the second series of multiplier circuits includes the plurality of squaring circuits.

14. A non-transitory computer readable medium defining a division circuit to generate a layout of a first integrated circuit design, the layout defining a plurality of masks, the masks defining a plurality of features in a fabrication process, the features defining an integrated circuit implementing multiplicative division of a dividend input and a divisor input, the division circuit defining the integrated circuit comprising:

a reciprocal circuit providing an approximation of a reciprocal of a divisor input;

a plurality of multiplier circuits receiving the approximation and refining a quotient output of the dividend input and a divisor input, wherein at least one of the plurality of multiplier circuits is a squaring circuit implementing multiplication preventing the squaring circuit from multiplication of any two unequal numbers and limiting the squaring circuit to multiplication of a same number by the same number, wherein the plurality of multiplier circuits includes a first series of multiplier circuits with increasingly refined quotient outputs, and a second series of multiplier circuits with decreasing error adjustment outputs, and the second series of multiplier circuits includes the squaring circuit, wherein, after a first one of the increasingly refined quotient outputs, an addition of addends by the integrated circuit generates each of the increasingly refined quotient outputs, wherein a first one of the addends is a prior one of the increasingly refined quotient outputs, and a second one of the addends is a product of a first operand and a second operand, the first operand being one of the decreasing error adjustment outputs and the second operand being the prior one of the increasingly refined quotient outputs, wherein the second one of the addends has a precision, and the precision of the second one of the addends is smaller in the addition to generate any subsequent one of the increasingly refined quotient outputs, than the precision of the second one of the addends in the addition to generate any earlier one of the increasingly refined quotient outputs, wherein each of the plurality of multiplier circuits has a maximum input operand size, the maximum input operand size of any subsequent multiplier circuit in the first series of multiplier circuits is smaller than the maximum input operand size of any prior multiplier circuit in the first series of multiplier circuits, and the maximum input operand size of any subsequent multiplier circuit in the second series of multiplier circuits is smaller than the maximum input operand size of any prior multiplier circuit in the second series of multiplier circuits, wherein the squaring circuit operates on an input operand having an input width smaller than at least one of the dividend input and the divisor input, wherein the squaring circuit is computationally sufficient to compute a subsequent one of the decreasing error adjustment outputs from a prior one of the decreasing error adjustment outputs.

15. The computer readable medium of claim 14, wherein the plurality of multiplier circuits includes a plurality of squaring circuits, and wherein the plurality of multiplier circuits includes the first series of multiplier circuits with increasingly refined quotient outputs, and the second series ofmultiplier circuits with decreasing error adjustment outputs, and the second series of multiplier circuits includes the plurality of squaring circuits.

\* \* \* \* \*